United States Patent [19]
Neher

[11] Patent Number: 5,905,461
[45] Date of Patent: May 18, 1999

[54] GLOBAL POSITIONING SATELLITE TRACKING DEVICE

[76] Inventor: Timothy J Neher, 411 Hobron La., no. 3204, Honolulu, Hi. 96815

[21] Appl. No.: 08/986,821

[22] Filed: Dec. 8, 1997

[51] Int. Cl.⁶ .............................. H04B 7/185; G01S 5/02
[52] U.S. Cl. ............................................ 342/357; 701/213
[58] Field of Search .............................. 315/357; 701/213

[56] References Cited

U.S. PATENT DOCUMENTS

| | | | |
|---|---|---|---|
| 5,576,952 | 11/1996 | Stutman et al. | 128/670 |
| 5,734,981 | 3/1998 | Kennedy, III et al. | 455/445 |
| 5,742,233 | 4/1998 | Hoffman et al. | 340/573 |
| 5,748,148 | 5/1998 | Heiser et al. | 342/457 |

*Primary Examiner*—Theodore M. Blum
*Attorney, Agent, or Firm*—Michael I. Kroll

[57] ABSTRACT

A global positioning and tracking system for locating one of a person and item of property. The global positioning and tracking system comprises at least one tracking device for connection to the one of the person and item of property including a processing device for determining a location of the tracking device and generating a position signal and a transmitter for transmitting said position signal. The position signal is transmitted to a relay station strategically positioned about a desired monitoring area. The relay station includes a device for receiving the positional signal and determining if the received position signal is a valid signal and a device for relaying the position signal upon determining the position signal is valid to a central monitoring station. The central monitoring station receives the validated positional signal from the relay station and analyzes the position signal for monitoring the position of the tracking device. The system may also include a tracking satellite for receiving the validated position signal from the relay station and re-transmitting the position signal to the central monitoring station when the central monitoring station is located outside the transmission range of the relay station.

13 Claims, 8 Drawing Sheets

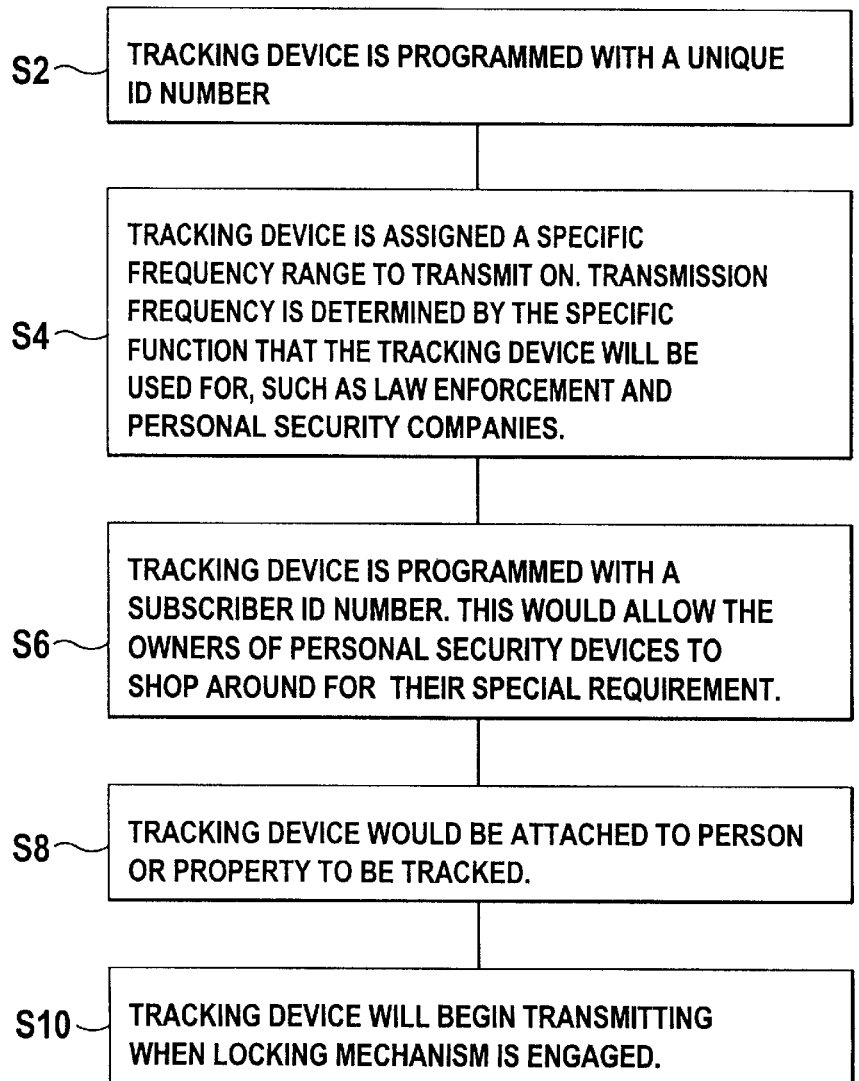

GLOBAL POSITIONING SATELLITE TRACKING DEVICE

BACKGROUND OF THE INVENTION

1. Field of the Invention

The present invention relates generally to tracking systems and, more specifically, to a global positioning tracking system for locating the position of a person or item anywhere at anytime.

2. Description of the Prior Art

Numerous tracking systems have been provided in the prior art. For example, U.S. Pat. Nos. 5,289,163; 5,461,365; 5,461,390; 5,617,074 and 5,627,548 all are illustrative of such prior art While these units may be suitable for the particular purpose to which they address, they would not be as suitable for the purposes of the present invention as heretofore described.

A child position monitoring device monitors the position of a child by detecting the signal strength of a radio frequency carrier from a transmitter attached to the child. If the signal of the radio frequency carrier is too weak, the child is to far away from the adult who has the child position monitoring device. When this happens, the adult is informed that the child has wandered too far away through the use of an audio tone or through the use of vibrations coming from the device. Once the adult is notified that the child is too far away, the device also has a locating display for indicating the relative direction of the child with respect to the adult The display uses eight LEDs arranged around an emblem used to represent the position of the adult. The LED which lights up indicates the relative direction of the child.

A personal alarm system includes a monitoring base station and one or more remote sensing units in two-way radio communication. An electronic handshake between the base station and each remote unit is used to assure system reliability. The remote units transmit at selectable power levels. In the absence of an emergency, a remote unit transmits at a power-conserving low power level. Received field strength is measured to determine whether a remote unit has moved beyond a predetermined distance from the base station. If the distance is exceeded, the remote unit transmits at a higher power level. The remote unit includes sensors for common hazards including water immersion, smoke, excessive heat, excessive carbon monoxide concentration, and electrical shock. The base station periodically polls the remote units and displays the status of the environmental sensors. The system is useful in child monitoring, for use with invalids, and with employees involved in activities which expose them to environmental risk. Alternative embodiments include a panic button on the remote unit for summoning help, and an audible beacon on the remote unit which can be activated from the base station and useful for locating strayed children. In another embodiment, the remote unit includes a Global Positioning System receiver providing location information for display by the base station.

A locator device for monitoring the location of subjects, usable in conjunction with a database system causes a polling signal to be sent periodically to each of the subject's locator devices in the area. The locator device includes a wireless transceiver to receive the polling message and, in response, query a location determination device for the current location of the device. This location is then sent back through the wireless network to the database. The database determines from a record on that particular subject where that subject is supposed to be at that time. If the subject being monitored is not within the area where he or she is supposed to be, then the database may automatically contact law enforcement officials.

A child finder basically consists of a transmitter which is concealingly attachable to a child's body and which sends a signal to a conventional receiver so that the child's location can be continually monitored. The transmitter will typically be carried in an article of jewelry, such as a watch, bracelet, ring, or the like, and will use a special on/off switch which allows the transmitter to be activated only when the jewelry is being worn by the child. The switch includes a reciprocal push button which closes the transmitter's electrical circuit when depressed, and the button is spring-biasedly moved away from electrical contact with the transmitter's circuit when the article of jewelry is not being worn. To protect against inadvertent partial movement of the button which could break electrical contact thus deactivating the transmitter an electrical contact surface of the button is provided with an upwardly extending electrically conductive spring finger which maintains continual electrical contact irrespective of temporary and inadvertent reciprocal movement of the spring finger recedes into a provided groove on the electrical contact surface of the button so as to prevent the finger from causing interference between the primary electrical contact surfaces.

A navigation wrist wear device comprises a GPS receiver fully disposed in a wrist watch type housing. A transparent microwave patch antenna is patterned of indium-tin-oxide on sapphire in front of an LCD time, position and velocity display. A bezel provides a protective window. A low-noise amplifier, down conversion, code processing and navigation processing are all provided on a single integrated circuit Photovoltaic solar cells to each side of the LCD help keep a battery charged.

SUMMARY OF THE PRESENT INVENTION

The present invention relates generally to tracking systems and, more specifically, to a global positioning tracking system for locating the position of a person or item anywhere at anytime.

A primary object of the present invention is to provide a global positioning and tracking system that will overcome the shortcomings of prior art devices.

Another object of the present invention is to provide a global positioning and tracking system which is able to locate individuals and personal property anywhere around the world.

An additional object of the present invention is to provide a global positioning and tracking system including a transmitter/receiver for attachment around an individuals wrist or ankle or to an item of personal property.

A still further object of the present invention is to provide a global positioning and tracking system that is operable in both a normal and standby mode.

An even further object of the present invention is to provide a global positioning and tracking system including a remote transmitter/receiver within a band made of an uncuttable material.

A still further object of the present invention is to provide a global positioning and tracking system including a band having an identification code unique to the particular band.

A yet further object of the present invention is to provide a global positioning and tracking system including an emergency activation button for alerting a main station as to the existence of an location of an emergency situation.

Another object of the present invention is to provide a global positioning and tracking system that is simple and easy to use.

A still further object of the present invention is to provide a global positioning and tracking system that is economical in cost to manufacture.

Additional objects of the present invention will appear as the description proceeds.

A global positioning and tracking system for locating one of a person and item of property is described by the present invention. The global positioning and tracking system comprises at least one tracking device for connection to the one of the person and item of property including a processing device for determining a location of the tracking device and generating a position signal and a transmitter for transmitting said position signal. The position signal is transmitted to a relay station strategically positioned about a desired monitoring area. The relay station includes a device for receiving the positional signal and determining if the received position signal is a valid signal and a device for relaying the position signal upon determining the position signal is valid to a central monitoring station. The central monitoring station receives the validated positional signal from the relay station and analyzes the position signal for monitoring the position of the tracking device. The system may also include a tracking satellite for receiving the validated position signal from the relay station and re-transmitting the position signal to the central monitoring station when the central monitoring station is located outside the transmission range of the relay station.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
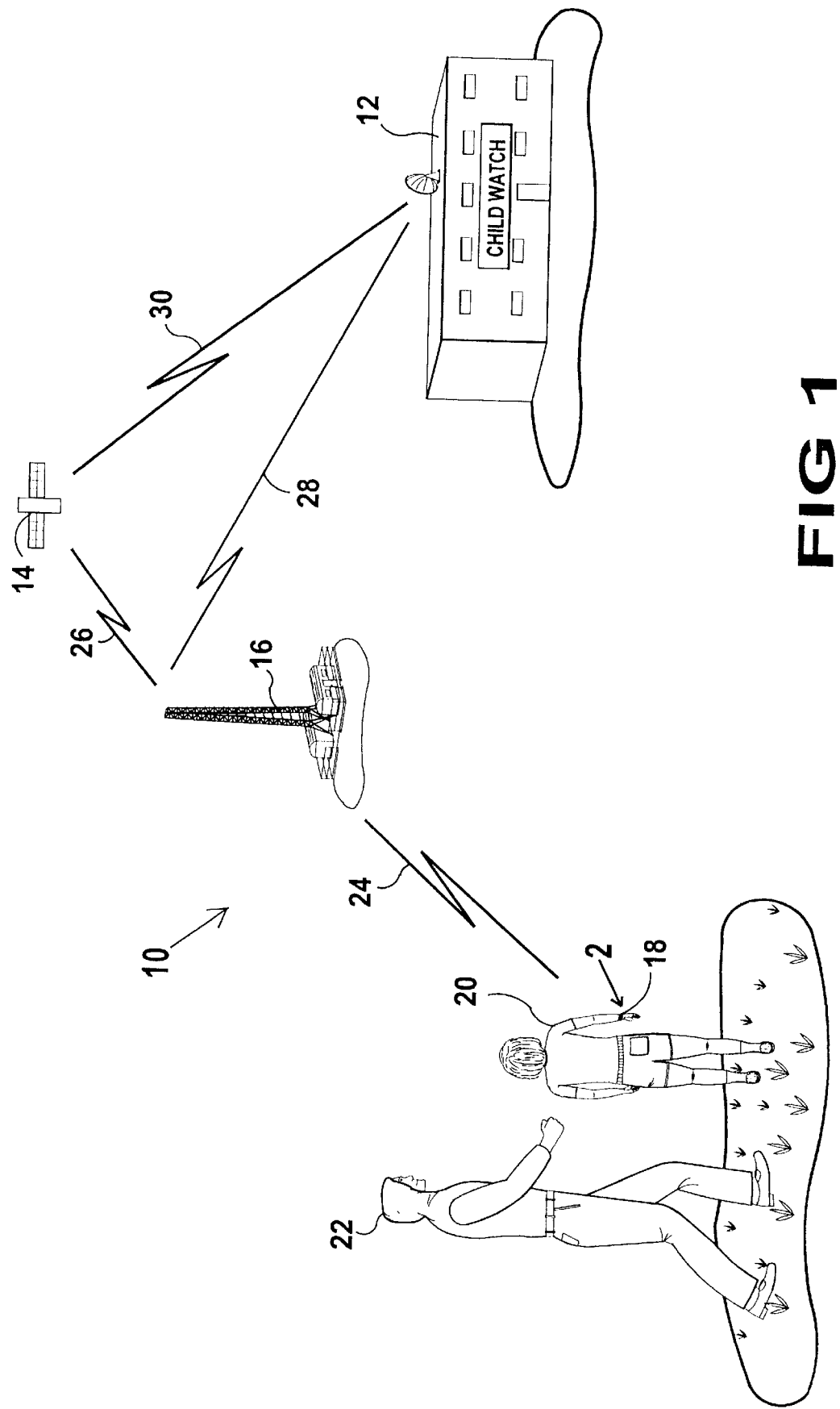
FIG. 1 is a perspective view of the global positioning and tracking system of the present invention used for tracking the location of a child.

Turning now descriptively to the drawings, in which similar reference characters denote similar elements throughout the several views, the Figures illustrate global positioning and tracking system of the present invention. With regard to the reference numerals used, the following numbering is used throughout the various drawing figures.

10 global positioning and tracking system of the present invention 12 central monitoring station of the global positioning and tracking system of the present invention 14 tracking satellite of the global positioning and tracking system of the present invention 16 local transmitter/receiver station of the global positioning and tracking system of the present invention 18 wristband/tracking unit of the global positioning and tracking system of the present invention 20 child wearing tracking device of the global positioning and tracking system of the present invention 22 guardian of child 24 line indicating transmission of location signal between tracking unit and relay station 26 line indicating transmission of location signal between relay station and tracking satellite 28 line indicating transmission of location signal between relay station and central monitoring station 30 line indicating transmission of location signal between tracking satellite and central monitoring station 32 wrist of user wearing tracking unit 34 smooth outer surface of tracking unit 36 face plate of tracking unit for engraving decorative or identification information thereon 38 locking mechanism 40 first shaft within first side of tracking unit 42 second shaft within first side of tracking unit 44 first side of tracking unit 46 second side of tracking unit 48 first prong extending from second side of tracking unit 50 second prong extending from second side of tracking unit 52 teeth on first prong 54 teeth on second prong 56 slide switch for transmitting distress signal 58 first position of slide switch 60 second position of slide switch 62 hinge 64 inner side of tracking unit 66 logic circuit within inner side of tracking unit 68 band of the tracking unit 70 transmission wire 72 first section of transmission wire 74 second section of transmission wire 76 first end of first section of transmission wire 78 second end of first section of transmission wire 80 first end of second section of transmission wire 82 second end of second section of transmission wire 84 microprocessor/logic device 86 power supply 88 memory
90 programmable EPROM
92 GPS logic circuit
94 input port connector
96 transmitter
98 emergency button

DETAILED DESCRIPTION OF THE PREFERRED EMBODIMENT

Turning now descriptively to the drawings, in which similar reference characters denote similar elements throughout the several views, FIGS. 1 through 6 illustrate the global positioning and tracking system of the present invention indicated generally by the numeral 10.

The global positioning and tracking system 10 is illustrated in FIG. 1 and includes a central monitoring station 12, a tracking satellite 14, a local relay station 16 and a wristband/tracking unit 18. The central monitoring station 12 monitors all movements of an activated tracking unit 18. The tracking unit 18 is attached to an item of personal property or to an individual such as a child 20 as illustrated in FIG. 1. The child 20 in the figure is being watched by a guardian 22 and being tracked by the global positioning and tracking system 10. When the tracking unit 18 is activated by the user 20 or the guardian 22 of the person or item being tracked, the tracking unit 18 will transmit a both an identification signal and a location signal to a nearby relay station 16 as is indicated by the line labeled 24. The location signal 24 may also include an identification code for the tracking unit 18 which will be compared to a data base of valid identification codes indicative of all possible tracking units at the relay station 16. If the location signal 24 is determined to be valid, the relay station 16 will transmit the received signal to either the tracking satellite 14 as indicated by the line labeled 26 or to a central monitoring station 12 as indicated by the line labeled 28. The location signal will be transmitted directly to the central monitoring station 12 if the relay station 16 is located within a predetermined distance from the central monitoring station 12. If the location signal is transmitted to the tracking satellite 14, the tracking satellite 14 will relay the signal to the central monitoring station 12 as is indicated by the line labeled 30. The signal received at the central monitoring unit 12 is then monitored to keep track of the position of the tracking unit 18 anywhere in the world. The extent of usefulness of the system 10 is based upon the range within which the tracking units 18 can transmit signals and the number of relay stations 16 positioned throughout the world to cover all areas in which a tracking unit 18 may be located.

Figure 2:
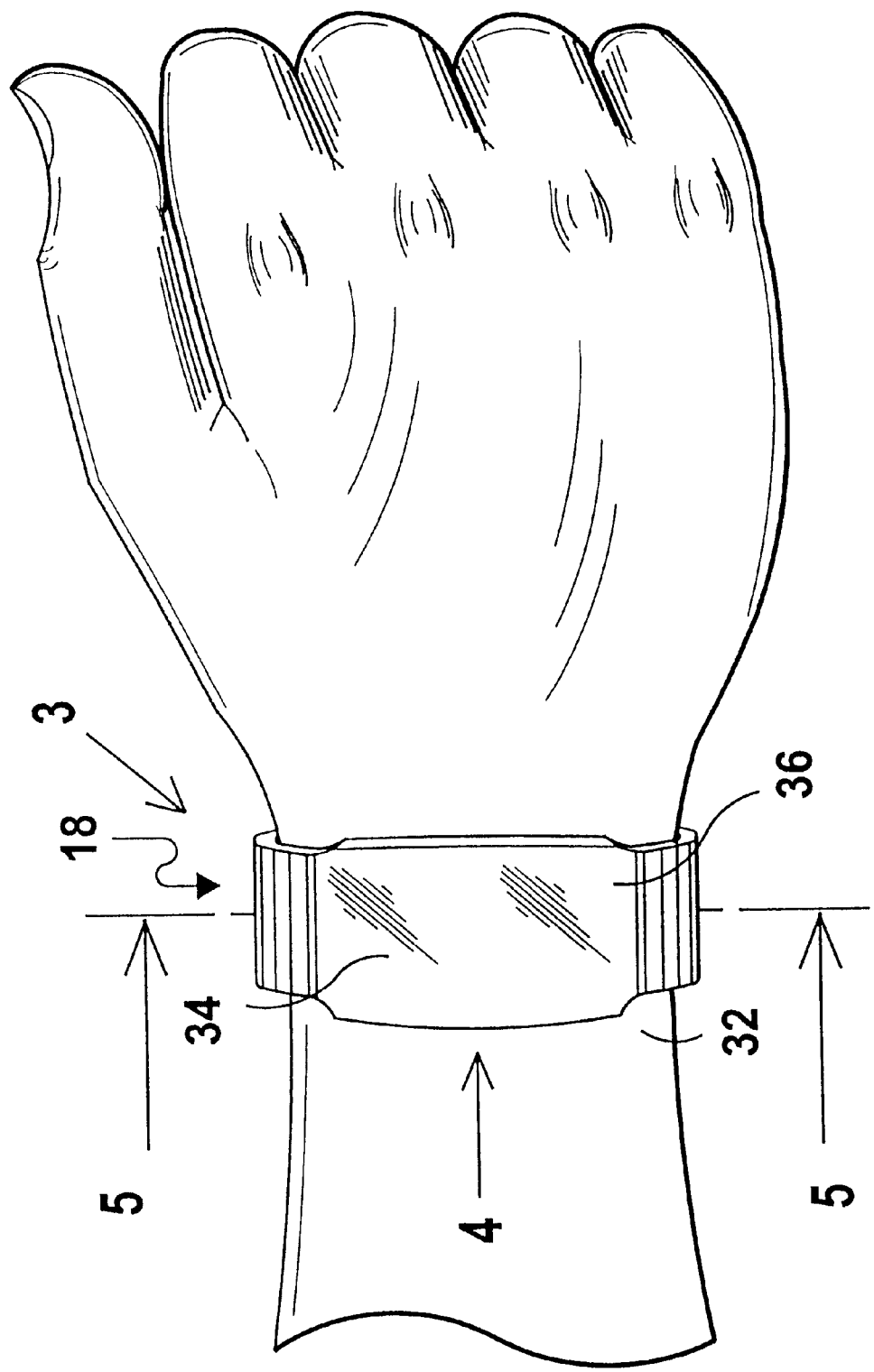
FIG. 2 is a perspective top view of a wristband used with the global positioning and tracking system of the present invention worn by a user whose position is to be tracked.

An exemplary embodiment of a tracking unit 18 is illustrated in FIGS. 2–5. FIG. 2 illustrates the tracking unit 18 connected about the wrist 32 of a user 20. The tracking unit 18 includes an outer surface 34 having a smooth texture. The tracking unit 18 may also include a face plate 36 which may be engraved with a child's name, a decoration to detract from the purpose of the device providing an ornamental feature to the device or even any other type of identification code. The tracking unit 18 is preferably made of an uncuttable material so that it is difficult or even impossible to remove without the proper unlocking mechanism. Thus, the tracking unit 18 can be used without worry for tracking the location of a child, a prisoner or inmate out on a work release program or furlough, senior citizens in need of medical care, personal property or even athletes such as hikers or mountain climbers moving through dangerous areas.

Figure 3:
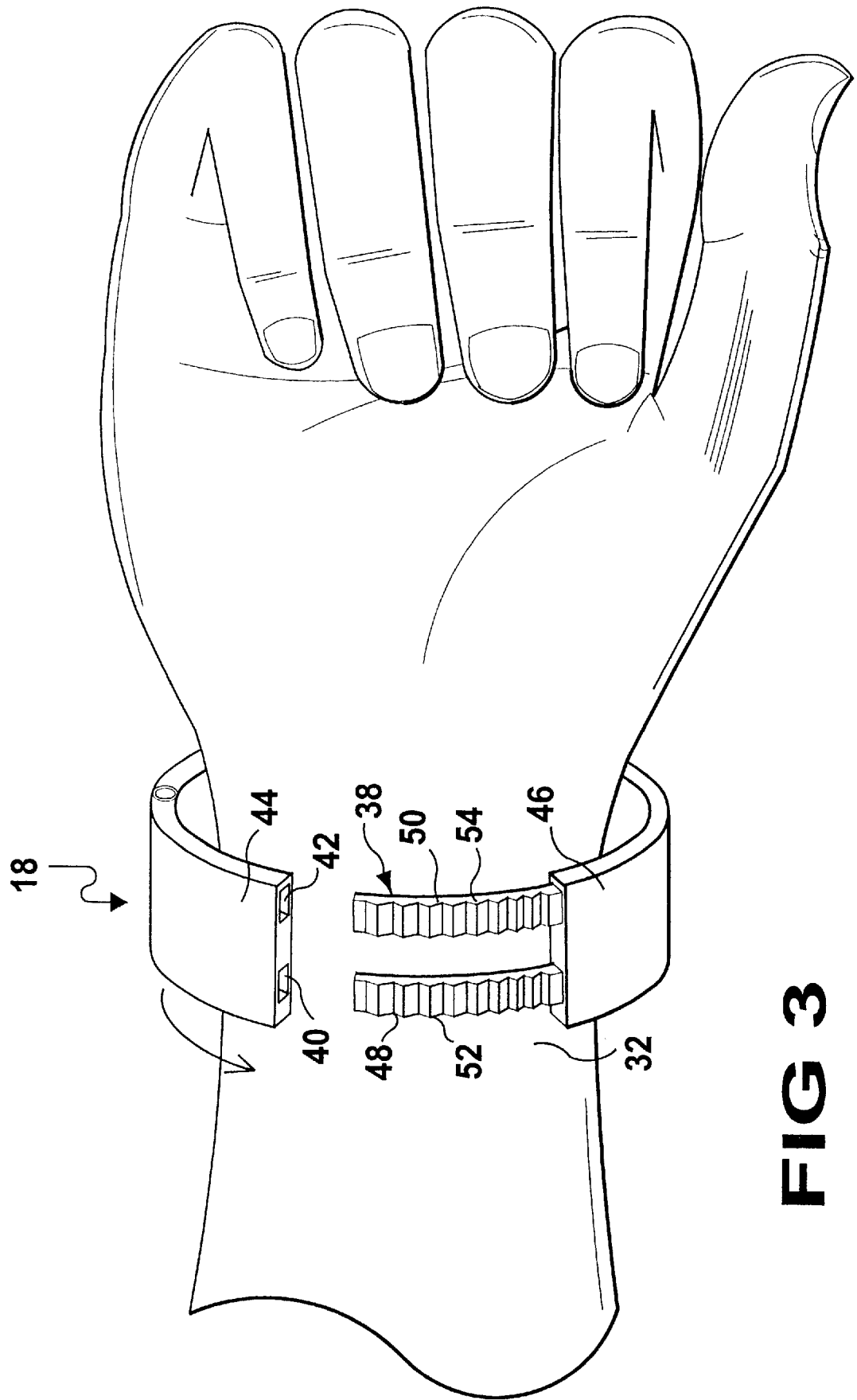
FIG. 3 is a perspective top view of a wristband used with the global positioning and tracking system of the present invention, the wrist band being in an unlocked position.

FIG. 3 illustrates an exemplary locking mechanism 38 for use with the tracking device 18 for connecting about the wrist 32 of the user 20. The locking mechanism 38 includes first and second prong shafts 40 and 42, respectively, on a first side 44 of the tracking unit 18. Extending from a second side 46 of the tracking unit 18 are first and second prongs 48 and 50, respectively. The first and second prongs 48 and 50 each include a top side having teeth 52 and 54 extending along a length thereof. In order to lock the tracking device 18 around a wrist 32 of the user 20, the first and second prongs 48 and 50 are inserted into respective ones of the first and second shafts 40 and 42. The teeth 52 and 54 on each of the prongs 48 and 50 releasably engage with the inner side of the respective shafts 40 and 42 for locking the tracking unit 18 closed. The locking mechanism 38 may be provided with a variety of possible locking mechanisms such as keys, combination locks, electronic locks, etc. to prevent the tracking device from being detached from the item or person once attached.

Figure 4:
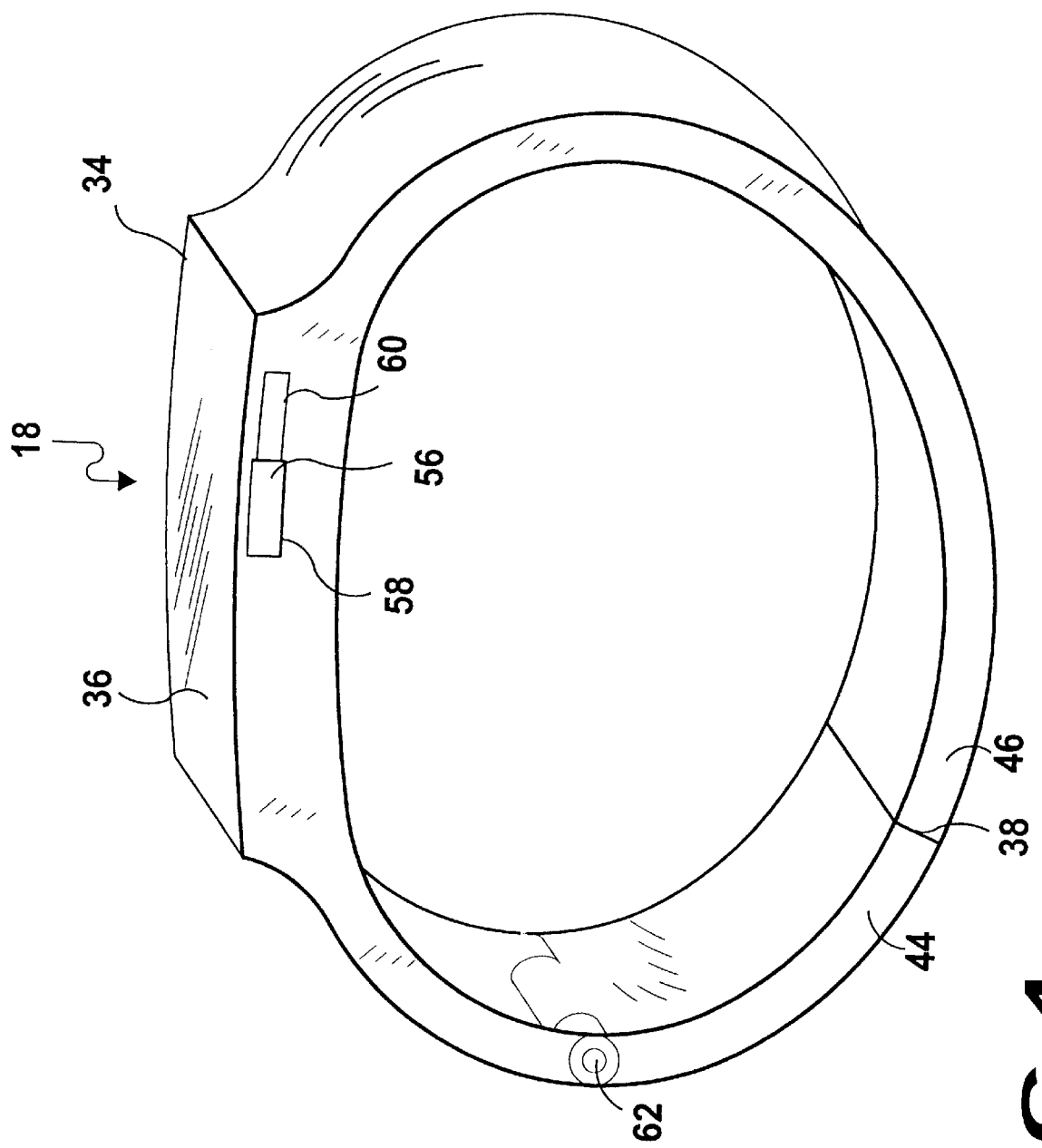
FIG. 4 is a perspective side view of the wristband used with the global positioning and tracking system of the present invention.

FIG. 4 illustrates the tracking unit 18 in an unattached condition, not connected to a user or item of personal property. This view illustrates a slide switch 56 for initiating transmission of a distress signal to the relay station 16 on a side of the unit 18. The slide switch 56 is movable between a first position 58 in which the distress signal is not transmitted and a second position 60 in which the tracking unit 18 is activated for transmitting the distress signal. The distress signal will be continuously transmitted until the user or another person moves the slide switch 56 back to the first position 58. The slide switch 56 must over come a frictional force to move between the first and second positions 58 and 60 and thus will not be unconsciously or unintentionally activated to transmit the distress signal. Also seen from this figure is a hinge 62. As the tracking unit 18 is made of a somewhat rigid inflexible material, the hinge 62 allows the first and second sides 44 and 46 to be separated when the tracking device 18 is either being placed about the wrist of the user or being removed therefrom.

Figure 5:
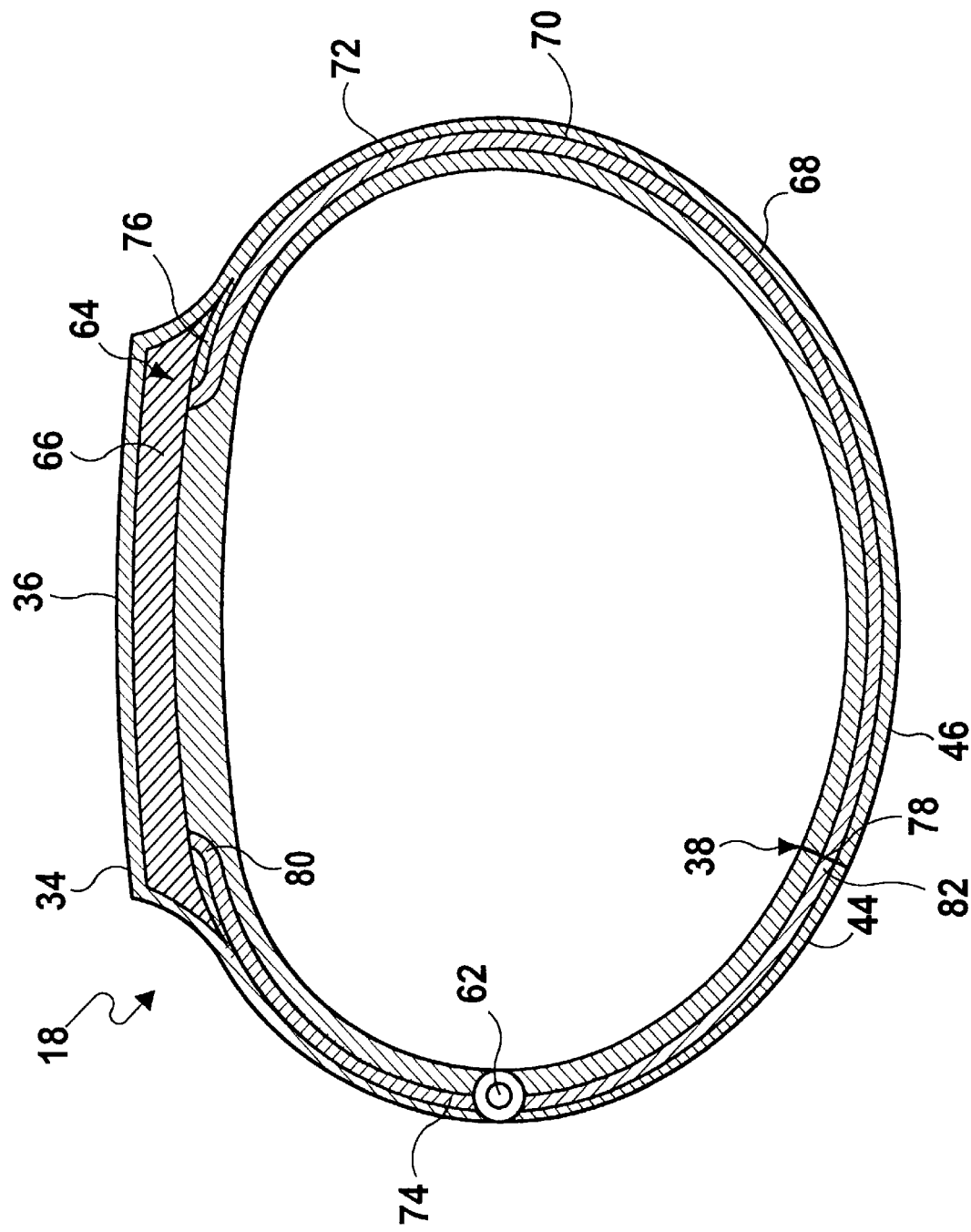
FIG. 5 is a perspective side cross-sectional view of a wristband used with the global positioning and tracking system of the present invention.

A cross-sectional view of the tracking unit 18 is illustrated in FIG. 5. Within an interior 64 of the tracking unit 18 is a logic circuit 66. Extending within a band 68 of the tracking unit 18 is a transmission wire 70. The transmission wire 70 is formed of first and second sections 72 and 74 respectively. The first section 72 includes a first end 76 connected to the logic circuit 66 and a second end 78 extending to the second end 46 of the tracking unit 18. The second section 74 includes a first end 80 connected to the logic circuit 66 and a second end 82 extending to the first end 44 of the tracking unit 18. When the locking mechanism 38 is closed joining the first and second sides 44 and 46, the first and second sections 72 and 74 of the transmission wire are connected to complete a full circuit with the logic circuit 66. When the circuit is broken such as if the band 68 is cut or the locking mechanism 38 is broken to release the tracking unit 18 from its position, the tracking unit 18 will automatically transmit the distress signal to alert the central monitoring station 12 as to the present situation.

Figure 6:
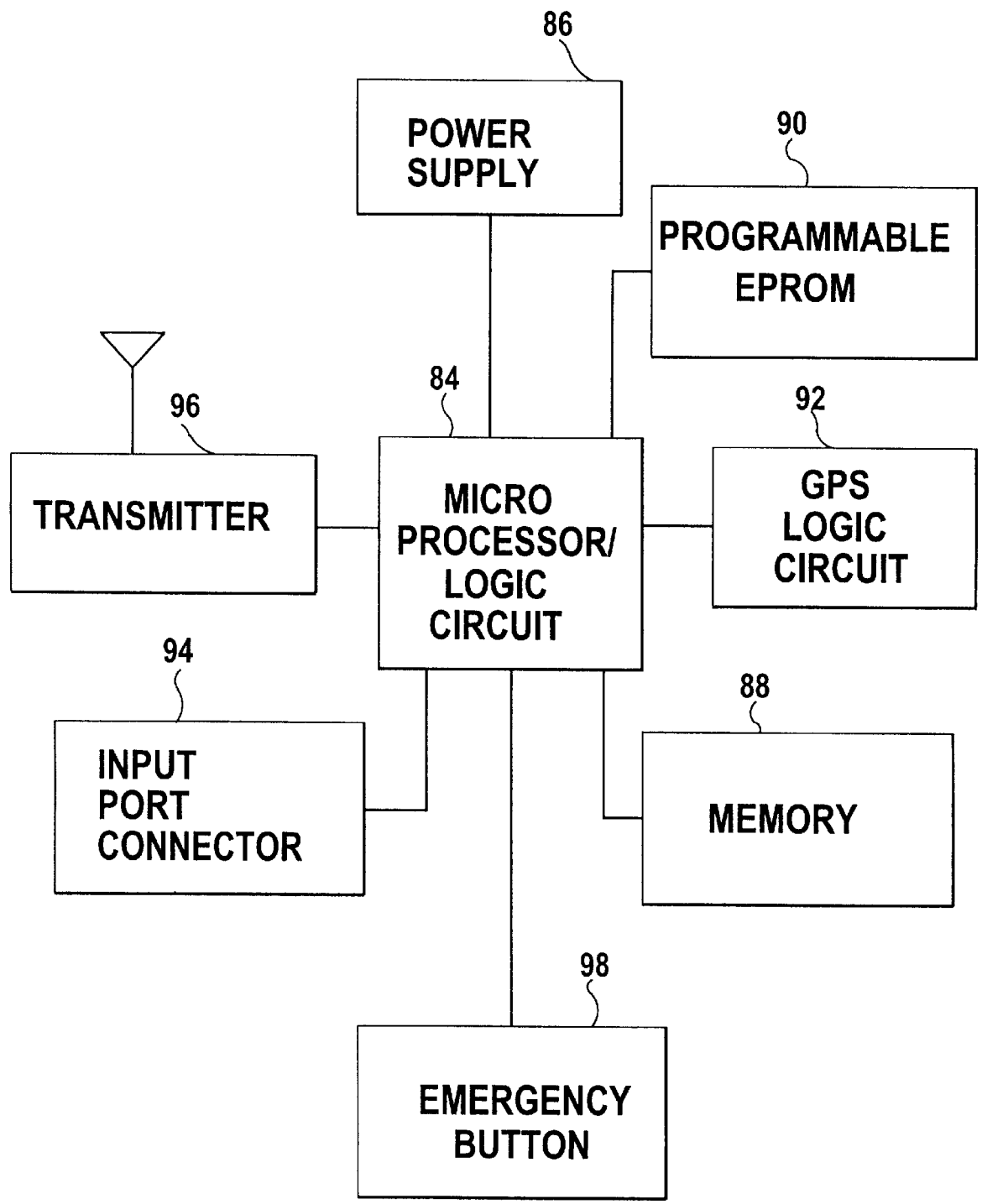
FIG. 6 is a schematic block diagram of the wristband used with the global positioning and tracking system of the present invention.

A schematic block diagram of the tracking unit 18 of the global positioning and tracking system 10 is shown in FIG. 6. As is clearly shown in this figure the tracking unit 18 includes a microprocessor/logic device 84. The microprocessor/logic device 84 is connected to receive operating power from a power supply 86. The power supply 86 may be any type of battery which is small enough to fit within the inner side 70 of the tracking device 18 or may even be a solar powered battery for powering the logic circuit Also connected to the microprocessor/logic device 84 is a memory unit 88 for storing the identification number and distress signal information, a programmable EPROM 90 for storing the operating software for the microprocessor/logic device 84 and a Global Positioning Satellite (GPS) logic circuit 92 for use in calculating the longitudinal, latitudinal and elevational position of the tracking unit 18 for transmission to the microprocessor/logic device 84 and ultimate transmission to the central monitoring station 12. An input port connector 94 is connected to the microprocessor/logic device 84 for use in inputting the identification information for storage in the memory 88. A transmitter 96 is connected to the microprocessor/logic device 84 for transmission of the identification information, GPS information and distress signals to the relay station 16 for ultimate transmission to the central monitoring station 12. An emergency button (slide switch) 98 is also connected to initiate transmission of the distress signal when activated or when the band of the tracking unit is cut or the lock is opened without proper authorization.

Figure 7B:
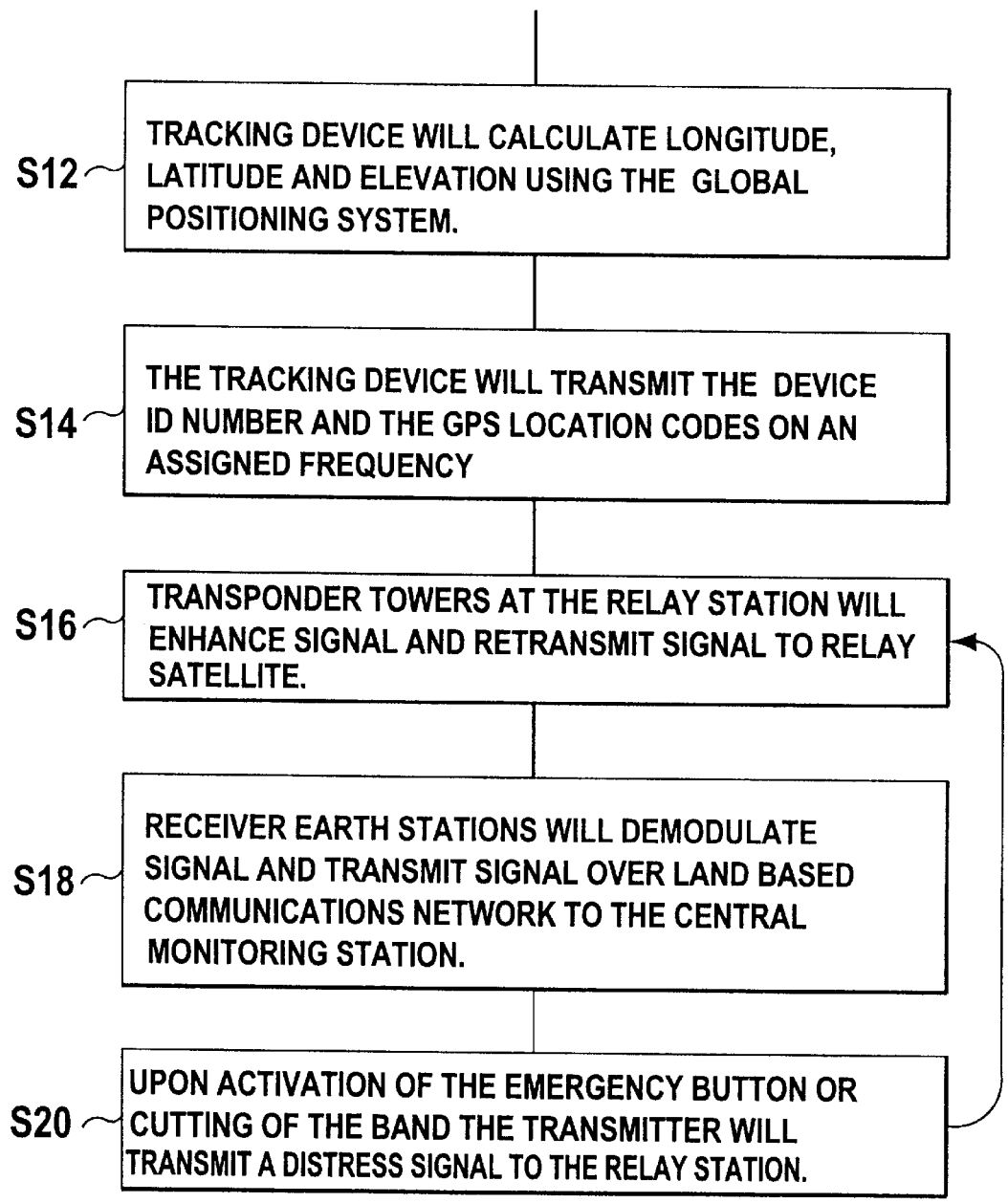
FIG. 7 is a flow chart describing the operating method of the global positioning and tracking system of the present invention.

The operation of the global positioning and tracking system 10 will now be described with reference to the figures and specifically to the flow chart of FIG. 7. In operation, the tracking unit 18 is programmed with an identification code or number unique to the particular unit either upon manufacturing or using an external programming device connected to the input port connector as described in step S2. The tracking unit 18 is then assigned a specific frequency range at which it may transmit the identification signal along with any distress signals and location information as stated in step S4. The frequency is determined based upon the specific use of the particular tracking unit 18 such as for law enforcement, personal security companies, child protection or locating personal property and the particular frequency range at which the relay stations are set for receiving transmitted signals. The tracking unit 18 may also be programmed with a subscriber ID number, each specific subscriber number providing particular service to the individual devices as discussed in step S6. This allows users to find tracking devices that would suit their personal intended uses.

The tracking device is now ready for operation and is connected to the particular individual or piece of personal property to be tracked as described in step S8. This is done by locking the tracking unit 18 to complete the circuit extending therethrough. The tracking unit 18 will then begin transmitting an identification signal once the locking mechanism is engaged as stated in step S10. The longitudinal, latitudinal and elevational position of the tracking unit is continually calculated by the GPS logic circuit upon engagement of the locking mechanism as discussed in step S12. The tracking unit 18 continually transmits the positional signal and identification signal to the relay station 16 as stated in step S14. The relay station 16 then enhances the received signal and relays the transmitted positional and identification signals to the tracking satellite 14 as discussed in step S16. The tracking satellite then retransmits the enhanced positional and identification signals to the central monitoring station 12 as described in step S18. If it is detected that the band of the tracking device has been cut to open the circuit or the emergency button has been activated, the tracking unit 18 will automatically transmit a distress signal in the same manner as described above and stated in step S20.

From the above description it can be seen that the global positioning and tracking system of the present invention is able to overcome the shortcomings of prior art devices by providing a global positioning and tracking system which is able to locate individuals and personal property anywhere around the world. The global positioning and tracking system including a transmitter/receiver for attachment around an individuals wrist or ankle which is operable in both a normal and standby mode and contained within a band made of an uncuttable material. Each band of the global positioning and tracking system has an identification code unique to the particular band for identification and location purposes and an emergency button for transmitting a distress signal when the wearer is in need. Furthermore, the global positioning and tracking system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A global positioning and tracking system for locating a person, said global positioning and tracking system comprising:

a) a tracking device for connection to said person including a processing device for determining a location of the tracking device and generating a position signal and a transmitter for transmitting said position signal;

b) at least one relay station strategically positioned about a desired monitoring area including means for receiving said position signal and determining if said received position signal is a valid signal and means for relaying said position signal upon determining said position signal is valid;

c) central monitoring station for receiving said validated position signal from said at least one relay station and analyzing said position signal for monitoring a position of said tracking device;

d) said tracking device being mounted within a decorative face plate forming part of a wrist band, first and second bands of rigid inflexible material extending from opposite sides of said face plate forming a loop for surrounding the wrist of a user, the free end of one band includes a pair of prong shafts for locking the two bands together, one of said bands having a hinged section extending from the free end thereof; and e) said decorative face plate having embedded therein said processing device, a transmission wire extending from one end of said face plate through said first and second bands to the opposite end of said face plate for completing the circuit in said processing device so that when said first and second bands are apart said tracking unit is nonfunctional and when said first and second bands are engaged said tracking unit is functional, and said wrist band including the decorative face plate and bands being free of any electronic display said device lacking any visible indication of its function.

2. The global positioning and tracking system as recited in claim 1, wherein said at least one relay station is able to transmit said validated position signal over a predetermined range and said system further comprises a tracking satellite for receiving said validated position signal from said at least one relay station and re-transmitting said position signal to said central monitoring station when said central monitoring station is located outside the transmission range of said at least one relay station.

3. The global positioning and tracking system as recited in claim 2, wherein said at least one relay station comprises a plurality of relay stations strategically positioned about said desired monitoring.

4. The global positioning and tracking system as recited in claim 3, wherein said system further comprises a plurality of tracking devices.

5. The global positioning and tracking system as recited in claim 4, wherein each of said plurality of tracking devices is in the form of a wristband for connection about a persons wrist.

6. The global positioning and tracking system as recited in claim 5, wherein said plurality of tracking devices each include a unique identification signal, said identification signal being transmitted to said plurality of relay stations with said position signal.

7. The global positioning and tracking system as recited in claim 6, wherein said plurality of relay stations each include a data base for storing identification codes of all of said plurality of tracking devices, said identification codes received from said plurality of tracking devices being compared to said identification codes stored in said data base for determining if the received position signal is valid.

8. The global positioning and tracking system as recited in claim 7, wherein said plurality of tracking devices each further include a memory for storing said unique identification code.

9. The global positioning and tracking system as recited in claim 8, wherein each of said plurality of tracking devices include a means for generating a distress signal for transmission to said central monitoring unit upon activation.

10. The global positioning and tracking system as recited in claim 9, wherein each of said plurality of tracking devices further include a switch for activating said means for generating a distress signal.

11. The global positioning and tracking system as recited in claim 9, wherein said means for generating a distress signal is activated when said tracking device is cut open.

12. The global positioning and tracking system as recited in claim 9, wherein said desired monitoring area is the entire earth.

13. The method of tracking continuously the location of a child utilizing a global positioning and tracking system comprising the steps of:
   a) placing a wrist band containing a tracking device on the wrist of said child which is lacking of any visible indication of its function, said tracking device including a processing device for determining the location of the tracking device and generating a position signal and a transmitter for transmitting said position signal;
   b) strategically positioning a relay station about a desired monitoring area including means for receiving said position signal and determining if said received position signal is a valid signal and means for relaying said position signal upon determining said position signal is valid;
   c) establishing a tracking satellite for receiving the validated position signal from said tracking device and retransmitting said position signal;
   c) establishing a central monitoring station for receiving said validated position signal from said relay station or said tracking satellite and analyzing said position signal for monitoring the position of said tracking device;
   d) said wrist band comprising a decorative face plate, first and second bands of rigid inflexible material extending from opposite sides of said face plate forming a loop for surrounding the wrist of a user, the free end of one band includes a pair of prong shafts for locking the two bands together, one of said bands having a hinged section extending from the free end thereof; and
   e) said decorative face plate having embedded therein said processing device, a transmission wire extending from one end of said face plate through said first and second bands to the opposite end of said face plate for completing the circuit in said processing device so that when said first and second bands are apart said tracking unit is nonfunctional and when said first and second bands are engaged said tracking unit is functional.

* * * * *